United States Patent [19]

Yan

[11] Patent Number: 5,057,204
[45] Date of Patent: Oct. 15, 1991

[54] CATALYTIC VISBREAKING PROCESS

[75] Inventor: Tsoung Y. Yan, Philadelphia, Pa.

[73] Assignee: Mobil Oil Corporation, Fairfax, Va.

[21] Appl. No.: 527,673

[22] Filed: May 21, 1990

Related U.S. Application Data

[63] Continuation-in-part of Ser. No. 378,456, Jul. 10, 1989, abandoned, which is a continuation of Ser. No. 223,825, Jul. 25, 1988, abandoned.

[51] Int. Cl.$^5$ .............................................. C10G 47/04
[52] U.S. Cl. .................................... 208/108; 208/107; 208/125
[58] Field of Search ............... 208/106, 112, 125, 126, 208/108, 107

[56] References Cited

U.S. PATENT DOCUMENTS

| | | | |
|---|---|---|---|
| 3,803,259 | 4/1974 | Porchey et al. | 208/106 |
| 4,029,571 | 6/1977 | Curtin | 208/106 |
| 4,108,798 | 8/1978 | Sze et al. | 208/125 |
| 4,142,961 | 3/1979 | Jensen | 208/91 |
| 4,233,138 | 11/1980 | Rollman et al. | 208/106 |
| 4,487,687 | 12/1984 | Simo et al. | 208/107 |
| 4,587,007 | 5/1986 | Rudnick | 208/125 |
| 4,597,855 | 7/1986 | Stapp | 502/215 |
| 4,604,188 | 8/1986 | Yan et al. | 208/125 |
| 4,642,175 | 2/1987 | Rudnick | 208/106 |

Primary Examiner—Anthony McFarlane
Attorney, Agent, or Firm—Alexander J. McKillop; Charles J. Speciale; Michael J. Mlotkowski

[57] ABSTRACT

The severity of visbreaking of an oil is increased without increasing the instability of the product by incorporating into the feedstock a catalyst preferably supported on a porous substrate. The catalyst is the elemental form or compound of an element selected from the group consisting of selenium, tellurium and sulfur.

9 Claims, 1 Drawing Sheet

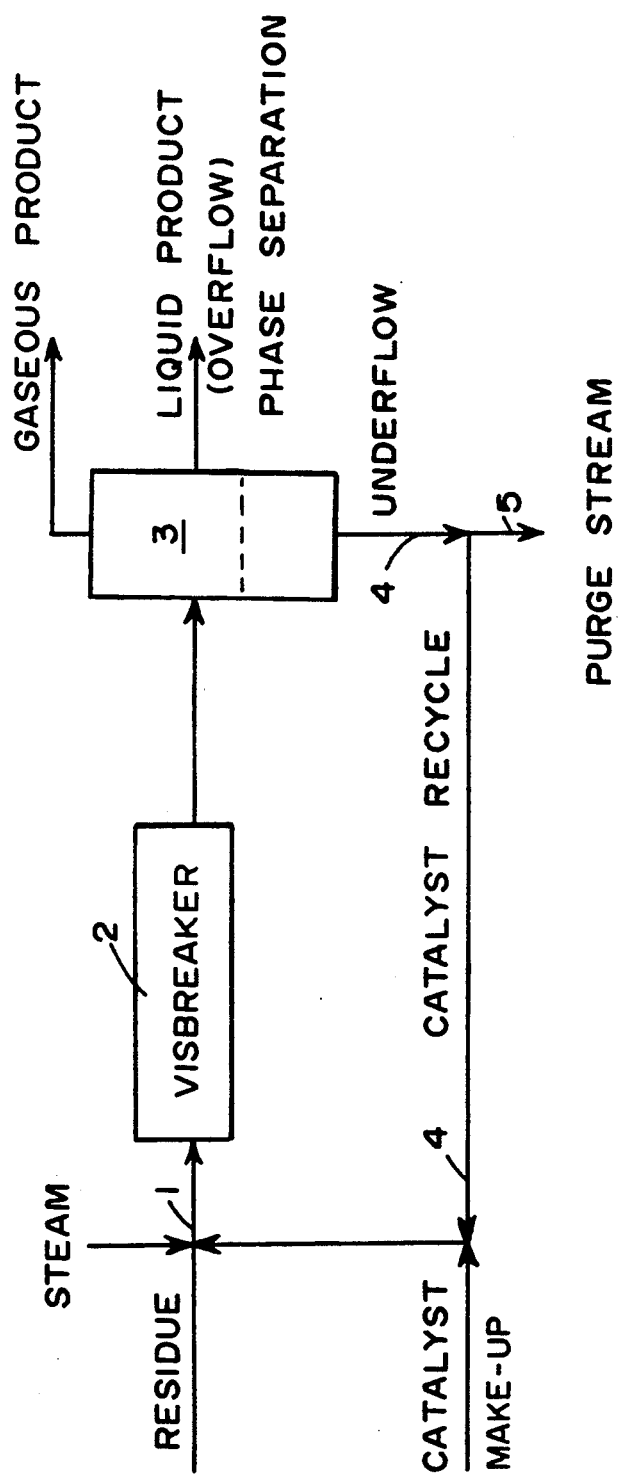

CATALYTIC VISBREAKING PROCESS

This is a continuation-in-part of copending application Ser. No. 378,456, filed on July 10, 1989, now abandoned, which is a continuation of copending application Ser. No. 223,825, filed on July 25, 1988, now abandoned.

NATURE OF THE INVENTION

This invention relates to visbreaking processes. More particularly it relates to a visbreaking process which is carried out in the presence of a catalyst thus permitting increased severity of visbreaking without increased instability of the liquid products produced.

BACKGROUND OF THE INVENTION

Visbreaking, or viscosity breaking, is a well known petroleum refining process in which heavy oils including residual fractions or reduced crudes are pyrolyzed, or cracked, under comparatively mild conditions to provide products having lower viscosities, thus reducing the amounts of less viscous and more valuable blending oils required to make the residual stocks useful as fuel oils. The visbreaker feedstock usually consists of one or more refinery streams derived from sources such as atmospheric residuum, vacuum residuum, furfural extract, propane-deasphalted tar and catalytic cracker bottoms. Most of these feedstock components, except the heavy aromatic oils, behave independently in the visbreaking operation. Consequently, the severity of the operation for a mixed feed is limited greatly by the least desirable (highest coke-forming) components. In a typical visbreaking process, the crude or resid feed is passed through a heater and heated to about 425° C. to about 525° C. at about 450 to about 7000 kPa. Light gas-oil may be recycled from the product fractionator to quench the visbreaker reactor effluent to about 260° C. to about 370° C. Cracked products from the reaction are flash distilled with the vapor overhead being fractionated into a light distillate overhead product, for example gasoline and light gas-oil bottoms, and the liquid bottoms are vacuum fractionated into heavy gas-oil distillate and residual tar. Examples of such visbreaking methods are described in Beuther et al, "Thermal Visbreaking of Heavy Residues," *The Oil and Gas Journal*, 57:46, Nov. 9, 1959, pp. 151–157; Rhoe et al, "Visbreaking: A Flexible Process," *Hydrocarbon Processing*, January 1979, pp. 131–136; and U.S. Pat. No. 4,233,138.

These processes have disadvantages such as the need for solvent deasphalting or separation units but, in particular, they fail to achieve one necessary objective in any heavy oil upgrading step, which is to increase the hydrogen:carbon ratio of the oil without doing this wastefully by simply rejecting carbon as a more refractory resid. Obviously, if hydrogen can be added to the feed without the disadvantages of using molecular hydrogen, a much more economical upgrading process will be at hand.

A number of proposals have been made for upgrading resids by thermal cracking processes which are operated with hydrogen, either alone or with hydrogen transfer solvents. For example, U.S. Pat. No. 4,292,168 discloses the upgrading of heavy hydrocarbon oils without substantial formation of char by heating the oil with hydrogen and a hydrogen transfer solvent without a catalyst at temperatures of about 320° C. to 500° C. and at elevated pressure for a time of about 3 to 30 minutes; examples of hydrogen-donor transfer solvents used in this process include pyrene, fluoranthene, anthracene and benzanthracene. U.S. Pat. No. 4,389,303 discloses a process for converting high boiling crudes with high resid contents by carrying out visbreaking, e.g. at temperatures from 380° C. to 480° C. in the presence of hydrogen as well as a donor solvent. These processes which use free hydrogen have the disadvantage, however, of being relatively expensive both in capital outlay (since pressure vessels and enlarged gas plants are necessary) and operating costs (since hydrogen is expensive). This is so, regardless of whether the hydrogen is contacted directly with the feedstock or used to regenerate the donor solvent. It would therefore be desirable to upgrade resids and other heavy oils without the need for free hydrogen.

I have now recognized that there is a great deal of transferable, donorable hydrogens in the resid feedstocks, because there are substantial hydroaromatics as well as compounds with labile hydrogen in the residues. It is estimated that there may be 0.2 to 2 milligrams of hydrogen per gram of the resid, depending on the nature of the resids. Unfortunately, under typical visbreaking conditions, most of these hydrogens are not transferable because of their low reactivities. If these potentially transferable hydrogens can be activated to stabilize the reactive radicals, the visbreaking severity can be increased significantly without causing product instability.

SUMMARY OF THE INVENTION

Briefly stated this invention comprises incorporating into the reaction mixture prior to conducting the visbreaking step a catalyst which will catalyze the transfer of hydrogen already present in a portion of the resids to other hydrocarbon molecules present in a portion of the feedstock having reactive radicals. Catalysts which have been found to be useful for this purpose include compounds of selenium and tellurium as well as sulfur.

THE DRAWINGS

The single FIGURE of the accompanying drawings shows a simplified flow diagram of a visbreaking process using a catalyst to promote hydrogen transfer.

DETAILED DESCRIPTION

Feedstock

The heavy oil feeds used in the present upgrading process may be a single refinery stream or a mixture of refinery streams derived from various sources. The present process is suitable for upgrading a wide variety of heavy liquid hydrocarbon oils in which at least 75 weight percent of the components boil over 370° C. Included in this class of feeds are residual fractions obtained by catalytic cracking of gas oils, solvent extracts obtained during the processing of lube oil stocks, asphalt precipitates obtained from deasphalting operations, high boiling bottoms or resids obtained during vacuum distillation of petroleum oils, tar sand bitumen feedstocks, and the like. These oils may contain heteroatom impurities such as nitrogen or sulfur as well as having relatively high metal contents.

Catalyst

Useful catalysts for the purpose disclosed herein include elemental selenium, tellurium, or sulfur and their compounds such as $SeO_2$, $Se_2Cl_2$, $SeCl_4$, $SeS$ and $SeSO_3$ and the corresponding compounds of tellurium. Often it will be desirable to utilize the catalyst wherein the active component, such as $SeO_2$ is impregnated on a pourous inert support such as silica, alumina, silica-alumina, clay, coal, and coke. Of these support materials coke and coal are preferred. A 10 to 400 mesh pellet size is preferred.

A measure of how much hydrogen is transferable from one portion of the residue to a portion of the residue having reactive radicals can be made thus. A sample of the resid to be processed and the catalyst are mixed with a hydrogen acceptor, for example, anthracene at a weight ratio of 10:1:10 (resid/ catalyst/acceptor) and heated in 10-degree-per-minute increments to a temperature of 400° C. in a closed container. The product is cooled and extracted with $CDCl_3$. The concentration of 9,10-dihydroanthracene (DHA) present is the measure of hydrogen transferred, as determined with nuclear magnetic resonance or other means. For every molecule of anthracene converted 4 atoms of hydrogen have been released from another portion of the resid. A similar test conducted in the absence of catalyst will show the amount of hydrogen available without utilizing the catalyst. The following table illustrates some determinations of the hydrogen available with and without a catalyst.

| Residue | Amount of Transferable Hydrogen in Presence of $SeO_2$, Mg/gram of Residue | Amount of Transferable Hydrogen in Absence of $SeO_2$, Mg/gram of Residue |
| --- | --- | --- |
| Daqing | 0.610 | 0.076 |
| Khafji | 0.370 | 0.120 |
| Wafra | 0.540 | 0.110 |

These results indicate that $SeO_2$ is an effective catalyst in promoting transfer of hydrogen from the residue to the acceptor. This transferable hydrogen effectively stabilizes the reactive cracked fragments in the visbreaking process leading to a stable product of low viscosity. These results also show that the amount of transferable hydrogen varies with the nature and source of the residue. These results also show that the effectiveness of the catalyst depends on the nature of the residue. The ratios of hydrogen transferable with and without $SeO_2$ catalyst are 8.0 and 3.1 for Daqing and Khafji crudes respectively. The Daqing crude is much more responsive to the catalyst than Khafji.

The visbreaking process using the catalyst of this invention can be operated on either a once-through basis or with the feed stock recycled. For a once-through mode the catalyst, for example $SeO_2$, is mixed into the feedstock before the feed stream flows to the heater. The level of catalyst required is between 0.001 and 1 percent of the weight of the residue feedstock. The severity of the visbreaking operation is increased from the original level available without catalyst to a previously unattainable maximum level without causing product instability. It is to be emphasized that the maximum levels of visbreaking depends on and varies greatly with the nature of the residue being processed. For the recycle mode, (FIG. 1) it is best to deposit the catalytic material on a support.

The catalyst of proper size is added to the feed stock, line 1, to form a slurry. The slurry is heated and visbroken in a visbreaker 2 at the highest severity without causing product instability. The effluent is passed over a settler 3, and the product is recovered as overflow. The underflow is a catalyst-rich slurry and is recycled through line 4. Carbon accumulated on the catalyst can be purged, line 5, to maintain the solids level in the system constant. In the recycle mode, the operation severity can be increased to greater levels than that for the single pass mode.

I claim:

1. In a process for visbreaking a hydrocarbon stream consisting of heavy petroleum residual oil in which the oil is subjected to temperatures, pressures, and reaction times sufficient to effect said visbreaking the improvement consisting of incorporating into the residual oil prior to the visbreaking step a catalyst consisting in elemental form or compound form of selenium or tellurium, and mixtures of these in an amount sufficient to promote and increase the transfer of hydrogen from a portion of said feedstream having donorable hydrogens to another portion of the feedstream having reactive radicals, the weight of active catalyst component utilized to residual oil being between about 0.001 and about 1 percent of the residual oil.

2. The process of claim 1 wherein the visbreaking is effected at a temperature between about 425° C. and about 525° C., a pressure between about 450 and about 7,000 kPa.

3. The process of claim 1 wherein the catalyst is selenium oxide.

4. The process of claim 1 wherein the active component of the catalyst is supported on a porous medium selected from the group consisting of silica, alumina, alumina-silica and clay.

5. The process of claim 1 wherein the active component of the catalyst is supported on a porous medium selected from the group consisting of coal, activated carbon, and coke.

6. The process of claim 1 wherein subsequent to said visbreaking step said catalyst is separated from the effluent product and recycled to the visbreaking step.

7. The process of claim 6 wherein the visbreaking is effected at a temperature of between about 425° C. and about 525° C., and a pressure between about 450 and about 7,000 kPa.

8. In a process for visbreaking a hydrocarbon stream consisting of heavy petroleum residual oil in which the oil is subjected to temperature, pressures, and reaction times sufficient to effect said visbreaking the improvement consisting of incorporating into the residual oil prior to the visbreaking step a catalyst consisting of $SeO_2$ impregnated on a coke support and having a mesh size of between about 10 and about 400, the weight of active catalyst component utilized to residual oil being between about 0.001 and about 1 percent of the weight of the residual oil, wherein the weight of active catalyst component utilized is sufficient to promote and increase the transfer of hydrogen from a portion of the hydrocarbon stream having donorable hydrogens to another portion of the hydrocarbon stream having reactive radicals.

9. The process of claim 8 wherein subsequent to said visbreaking step said catalyst is separated from the effluent product and recycled to the visbreaking step.

* * * * *